United States Patent
Itoguchi

(10) Patent No.: US 9,434,806 B2
(45) Date of Patent: Sep. 6, 2016

(54) METHOD FOR PRODUCING PROPYLENE POLYMERIC MATERIAL

(71) Applicant: Sumitomo Chemical Company, Limited, Tokyo (JP)

(72) Inventor: Satoshi Itoguchi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/837,654

(22) Filed: Aug. 27, 2015

(65) Prior Publication Data

US 2016/0060378 A1 Mar. 3, 2016

(30) Foreign Application Priority Data

Aug. 29, 2014 (JP) ................. 2014-175090

(51) Int. Cl.
*C08F 210/00* (2006.01)
*C08L 23/00* (2006.01)
*C08F 293/00* (2006.01)
*C08L 23/14* (2006.01)

(52) U.S. Cl.
CPC .......... *C08F 293/005* (2013.01); *C08L 23/142* (2013.01); *C08L 2205/025* (2013.01); *C08L 2308/00* (2013.01); *C08L 2314/02* (2013.01)

(58) Field of Classification Search
CPC ....... C08J 5/18; C08J 2323/10; C08L 23/10; C08L 2205/02; C08L 2666/06
USPC .......................................... 525/240; 526/348
See application file for complete search history.

(56) References Cited

U.S. PATENT DOCUMENTS

| | | | |
|---|---|---|---|
| 5,623,021 A | 4/1997 | Pelliconi et al. | |
| 6,342,564 B1 | 1/2002 | Pitkanen et al. | |
| 2002/0019489 A1 | 2/2002 | Yamamoto et al. | |
| 2003/0144448 A1 | 7/2003 | Ebara et al. | |
| 2003/0220452 A1 | 11/2003 | Ebara et al. | |
| 2005/0197456 A1 | 9/2005 | Nicolini et al. | |
| 2008/0188622 A1* | 8/2008 | Nozawa | C08J 5/18 525/240 |

FOREIGN PATENT DOCUMENTS

| | | |
|---|---|---|
| EP | 0426139 A2 | 5/1991 |
| JP | H0848837 A | 2/1996 |
| JP | 2008260827 A | 10/2008 |
| JP | 2011052124 A | 3/2011 |
| WO | 0011076 A1 | 3/2000 |

OTHER PUBLICATIONS

Extended Search Report issued Feb. 23, 2016 in EP Application No. 15182581.7.

* cited by examiner

*Primary Examiner* — William Cheung

(74) *Attorney, Agent, or Firm* — Panitch Schwarze Belisario & Nadel LLP

(57) ABSTRACT

A method is provided for producing a propylene polymeric material containing a propylene polymer component high in content of α-olefin units. The material can be produced stably without stopping of the operation due to clogging of a pipe. The method is one for producing a propylene polymeric material composed of a propylene polymer component (A) and a propylene polymer component (B) via at least two steps, including a first step of producing the component (A) and a second step of producing the component (B) in a gas phase. The partial pressure of the α-olefin having four or more carbon atoms in the gas phase in the second step reactor is 0.10 MPa or more. A formula, $X \leq 0.0025 \times Y + 0.2850$, is satisfied, wherein the partial pressure is X MPa, and the content of the propylene polymer component (A) in the propylene polymeric material is Y % by weight.

2 Claims, No Drawings

METHOD FOR PRODUCING PROPYLENE POLYMERIC MATERIAL

BACKGROUND OF THE INVENTION

1. Technical Field

The present invention relates to a method for producing a propylene polymeric material whereby a propylene polymeric material can be produced with stability without occurrence of stop of the operation due to clogging of a pipe.

2. Background Art

Propylene polymeric materials are used in various fields such as food fields. In food fields, there is a need for propylene polymeric materials superior in heat sealability, and such materials are being developed.

For example, JP-A-H8-48837 discloses a crystalline propylene copolymer composition comprising a copolymer of propylene and ethylene and a copolymer of propylene, ethylene, and a C4-C8 α-olefin.

The heat sealability of the crystalline propylene copolymer composition disclosed in the patent document is at a level where further improvement is required. On the other hand, superior heat sealability is exhibited by a propylene polymeric material that comprises a propylene polymer component high in content of monomer units derived from an α-olefin and that is produced via at least two continuous steps. However, this propylene polymeric material cannot be withdrawn from a reactor because agglomerates are readily formed during its production or stickiness is readily exhibited due to generation of amorphous components or low molecular weight components, and its stable production was difficult due to occurrence of stop of the operation due to clogging of a pipe.

SUMMARY OF THE INVENTION

Under such circumstances, it is an object of the present invention to provide a method for producing a propylene polymeric material, the method being capable of stably producing a propylene polymeric material containing a propylene polymer component high in content of monomer units derived from an α-olefin, without occurrence of stop of the operation due to clogging of a pipe.

The present invention relates to a method for producing a propylene polymeric material composed of not less than 11% by weight and less than 35% by weight of a propylene polymer component (A) defined below and more than 65% by weight and less than 89% by weight of a propylene polymer component (B) defined below via at least two steps, where the whole amount of the propylene polymeric material is taken as 100% by weight, the method comprising the following first step and second step:

the first step of polymerizing at least propylene and ethylene within a reactor to produce the propylene polymer component (A), and the second step of polymerizing at least propylene and an α-olefin having 4 or more carbon atoms, in a gas phase contained within a reactor, in the presence of the propylene polymer component (A) under conditions fulfilling the following requirement (a) to produce the propylene polymer component (B), wherein the propylene polymer component (A) is: a propylene-ethylene copolymer component (A1) comprising monomer units derived from propylene and monomer units derived from ethylene, wherein the content of the monomer units derived from propylene is not less than 90% by weight and not more than 99% by weight and the content of the monomer units derived from ethylene is not less than 1% by weight and not more than 10% by weight, where the sum total of the content of the monomer units derived from propylene and the content of the monomer units derived from ethylene is taken as 100% by weight, or a propylene-ethylene-α-olefin copolymer component (A2) comprising monomer units derived from propylene, monomer units derived from ethylene, and monomer units derived from an α-olefin having 4 or more carbon atoms, wherein the content of the monomer units derived from propylene is not less than 85% by weight and not more than 98.9% by weight, the content of the monomer units derived from ethylene is not less than 1% by weight and not more than 10% by weight, and the content of the monomer units derived from the α-olefin having 4 or more carbon atoms is not less than 0.1% by weight and not more than 5% by weight, where the sum total of the content of the monomer units derived from propylene, the content of the monomer units derived from ethylene, and the content of the monomer units derived from the α-olefin having 4 or more carbon atoms is taken as 100% by weight, the propylene polymer component (B) is: a propylene-α-olefin copolymer component (B1) comprising monomer units derived from propylene and monomer units derived from an α-olefin having 4 or more carbon atoms, wherein the content of the monomer units derived from propylene is not less than 50% by weight and not more than 80% by weight and the content of the monomer units derived from the α-olefin having 4 or more carbon atoms is not less than 20% by weight and not more than 50% by weight, where the sum total of the content of the monomer units derived from propylene and the content of the monomer units derived from the α-olefin having 4 or more carbon atoms is taken as 100% by weight, or a propylene-ethylene-α-olefin copolymer component (B2) comprising monomer units derived from propylene, monomer units derived from ethylene, and monomer units derived from an α-olefin having 4 or more carbon atoms, wherein the content of the monomer units derived from propylene is not less than 40% by weight and not more than 79.9% by weigh, the content of the monomer units derived from ethylene is not less than 0.1% by weight and not more than 10% by weight, and the content of the monomer units derived from the α-olefin having 4 or more carbon atoms is not less than 20% by weight and not more than 50% by weight, where the sum total of the content of the monomer units derived from propylene, the content of the monomer units derived from ethylene, and the content of the monomer units derived from the α-olefin having 4 or more carbon atoms is taken as 100% by weight, and requirement (a) is that the partial pressure of the α-olefin having 4 or more carbon atoms in the gas phase contained within the reactor of the second step is not lower than 0.10 MPa, and the following formula (1) is satisfied: wherein said partial pressure is expressed by X MPa and the content of the propylene polymer component (A) in the propylene polymeric material is expressed by Y % by weight, where the whole amount of the propylene polymeric material is taken as 100% by weight.

$$X \leq 0.0025 \times Y + 0.2850 \tag{1}$$

In the above-described method, the propylene polymer component (A) obtained in the first step is transported to the reactor for the second step.

According to the present invention, a propylene polymeric material containing a propylene polymer component being high in content of monomer units derived from an α-olefin can be produced with stability without occurrence of stop of the operation due to clogging of a pipe.

DETAILED DESCRIPTION OF THE INVENTION

<Propylene Polymer Component (A)>

The propylene polymer component (A) of the present invention is a propylene-ethylene copolymer component (A1) or a propylene-ethylene-α-olefin copolymer component (A2).

The propylene-ethylene copolymer component (A1) is a copolymer comprising monomer units derived from propylene and monomer units derived from ethylene, and the propylene-ethylene-α-olefin copolymer component (A2) is a copolymer comprising monomer units derived from propylene, monomer units derived from ethylene, and monomer units derived from an α-olefin having 4 or more carbon atoms.

Preferably, the α-olefin having 4 or more carbon atoms in the propylene-ethylene-α-olefin copolymer component (A2) is an α-olefin having 4 to 20 carbon atoms. Examples thereof include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. The α-olefin having 4 to 20 carbon atoms is preferably an α-olefin having 4 to 8 carbon atoms, more preferably 1-butene, 1-pentene, 1-hexene, or 1-octene, and even more preferably 1-butene from the perspective of being easier to be copolymerized with propylene or ethylene.

When the propylene polymer component (A) is said propylene-ethylene copolymer component (A1), the content of the monomer units derived from propylene in the propylene-ethylene copolymer component (A1) is 90% by weight to 99% by weight, preferably 92% by weight to 98% by weight, more preferably 94% by weight to 96.9% by weight. The content of the monomer units derived from ethylene in the propylene-ethylene copolymer component (A1) is 1% by weight to 10% by weight, preferably 2% by weight to 8% by weight, more preferably 3.1% by weight to 6% by weight. It is noted that the sum total of the content of the monomer units derived from propylene and the content of the monomer units derived from ethylene is taken as 100% by weight.

When the propylene polymer component (A) is said propylene-ethylene-α-olefin copolymer component (A2), the content of the monomer units derived from propylene in the propylene-ethylene-α-olefin copolymer component (A2) is 85% by weight to 98.9% by weight, preferably 89% by weight to 97.9% by weight, more preferably 92% by weight to 96.8% by weight. The content of the monomer units derived from ethylene in the propylene-ethylene-α-olefin copolymer component (A2) is 1% by weight to 10% by weight, preferably 2% by weight to 8% by weight, more preferably 3.1% by weight to 6% by weight. The content of the monomer units derived from the α-olefin having 4 or more carbon atoms in the propylene-ethylene-α-olefin copolymer component (A2) is 0.1% by weight to 5% by weight, preferably 0.1% by weight to 3% by weight, more preferably 0.1% by weight to 2% by weight. It is noted that the sum total of the content of the monomer units derived from propylene, the content of the monomer units derived from ethylene, and the content of the monomer units derived from the α-olefin having 4 or more carbon atoms is taken as 100% by weight.

<Propylene Polymer Component (B)>

The propylene polymer component (B) of the present invention is a propylene-α-olefin copolymer component (B1) or a propylene-ethylene-α-olefin copolymer component (B2).

The propylene-α-olefin copolymer component (B1) is a copolymer comprising monomer units derived from propylene and monomer units derived from an α-olefin having 4 or more carbon atoms, and the propylene-ethylene-α-olefin copolymer component (B2) is a copolymer comprising monomer units derived from propylene, monomer units derived from ethylene, and monomer units derived from an α-olefin having 4 or more carbon atoms.

Preferably, the α-olefin having 4 or more carbon atoms in each of the propylene-α-olefin copolymer component (B1) and the propylene-ethylene-α-olefin copolymer component (B2) is an α-olefin having 4 to 20 carbon atoms, and examples thereof include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. The α-olefin having 4 to 20 carbon atoms is preferably an α-olefin having 4 to 8 carbon atoms, more preferably 1-butene, 1-pentene, 1-hexene, or 1-octene, and even more preferably 1-butene from the perspective of being easier to be copolymerized with propylene or ethylene.

When the propylene polymer component (B) is said propylene-α-olefin copolymer component (B1), the content of the monomer units derived from propylene in the propylene-α-olefin copolymer component (B1) is 50% by weight to 80% by weight, preferably 60% by weight to 79% by weight, more preferably 70% by weight to 79% by weight. The content of the monomer units derived from the α-olefin having 4 or more carbon atoms in the propylene-α-olefin copolymer component (B1) is 20% by weight to 50% by weight, preferably 21% by weight to 40% by weight, more preferably 21% by weight to 30% by weight, where the sum total of the content of the monomer units derived from propylene and the content of the monomer units derived from the α-olefin having 4 or more carbon atoms is taken as 100% by weight.

When the propylene polymer component (B) is said propylene-ethylene-α-olefin copolymer component (B2), the content of the monomer units derived from propylene in the propylene-ethylene-α-olefin copolymer component (B2) is 40% by weight to 79.9% by weight, preferably 55% by weight to 78.9% by weight, more preferably 67% by weight to 78.9% by weight. The content of the monomer units derived from ethylene in the propylene-ethylene-α-olefin copolymer component (B2) is 0.1% by weight to 10% by weight, preferably 0.1% by weight to 5% by weight, more preferably 0.1% by weight to 3% by weight. The content of the monomer units derived from the α-olefin having 4 or more carbon atoms in the propylene-ethylene-α-olefin copolymer component (B2) is 20% by weight to 50% by weight, preferably 21% by weight to 40% by weight, more preferably 21% by weight to 30% by weight, where the sum total of the content of the monomer units derived from propylene, the content of the monomer units derived from ethylene, and the content of the monomer units derived from the α-olefin having 4 or more carbon atoms is taken as 100% by weight.

The propylene polymeric material of the present invention is a material composed of the propylene polymer component (A) and the propylene polymer component (B).

The content of the propylene polymer component (A) in the propylene polymeric material is not less than 11% by weight and less than 35% by weight, preferably not less than 11% by weight and not more than 30% by weight, and more preferably not less than 11% by weight and less than 20% by weight. The content of the propylene polymer component (B) in the propylene polymeric material is more than 65% by weight and less than 89% by weight, preferably not less than 70% by weight and not more than 89% by weight, and more preferably more than 80% by weight and not more than 89% by weight.

The intrinsic viscosity ([η], unit: dl/g) of the propylene polymeric material of the present invention is preferably 1.0 dl/g to 10.0 dl/g, more preferably 1.5 dl/g to 4.0 dl/g.

[η] is a value of an intrinsic viscosity obtained by measuring a reduced viscosity in tetralin at 135° C. with an Ubbelohde viscometer and then calculating the intrinsic viscosity by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

The method for producing a propylene polymeric material of the present invention is a method in which the material is produced via at least two steps, wherein the propylene polymer component (A) is produced in a first step and the propylene polymer component (B) is produced in a second step.

Specifically, it is a method wherein a catalyst is added to a reactor and at least propylene and ethylene are polymerized in the reactor to produce the propylene polymer component (A) in the first step, then the propylene polymer component (A) is transferred to a reactor for the second step, and then, in the second step, at least propylene and an α-olefin having 4 or more carbon atoms are polymerized, in a gas phase contained within the reactor, in the presence of the propylene polymer component (A) to produce the propylene polymer component (B).

Examples of the catalyst to be used in the production of the propylene polymeric material include a Ziegler-Natta catalyst and a metallocene based catalyst, and preferred is a Ziegler-Natta catalyst.

Examples of the Ziegler-Natta catalyst include a Ti—Mg based catalyst, such as a solid catalyst component produced by bringing a titanium compound into contact with a magnesium compound, and a catalyst comprising a solid catalyst component produced by bringing a titanium compound into contact with a magnesium compound, an organoaluminum compound and, according to necessity, a third component, such as an electron donating compound; a catalyst comprising a solid catalyst component produced by bringing a titanium compound into contact with a magnesium compound, an organoaluminum compound and, according to necessity, a third component, such as an electron donating compound is preferred, and a catalyst comprising a solid catalyst component produced by bringing a halogenated titanium compound into contact with a magnesium compound, an organoaluminum compound, and an electron donating compound is more preferred (see JP-A-61-218606, JP-A-61-287904, JP-A-7-216017, and JP-A-2004-67850).

Regarding the catalyst, it is permitted to transfer, without deactivation, a catalyst added in the first step, and use it in the second step, and it is also permitted to newly add a catalyst during the second step. Alternatively, it is also permitted to bring a catalyst into contact with a small amount of olefin, thereby preliminarily activating it, and then add it to the first step.

Examples of a method for producing the propylene polymer component (A) in the first step include a bulk polymerization method, a gas phase polymerization method, and a solvent polymerization method, in which an inert solvent, such as hexane, heptane, octane, decane, cyclohexane, methyl cyclohexane, benzene, toluene, and xylene, is used. As a method for producing the propylene polymer component (A), a bulk polymerization method or a gas phase polymerization method is preferred because post-treatment is easy.

The production of the propylene polymer component (A) in the first step may be carried out in one reactor or alternatively may be carried out using a plurality of reactors.

The polymerization temperature at which the propylene polymer component (A) is produced in the first step is usually 20° C. to 150° C.; from the perspective that the production efficiency of a propylene polymeric material is good, it is preferably 35° C. to 95° C. The polymerization pressure at which the propylene polymer component (A) is produced is usually atmospheric pressure of more; from the perspective that the efficiency of the production of a propylene polymeric material is higher, it is preferably 0.5 MPa or more, more preferably 1.0 MPa or more.

The method for producing the propylene polymeric material of the present invention may comprise, after the first step, a step of removing unreacted monomers, hydrogen, a solvent for diluting the catalyst, and the like which remain after the production of the propylene polymer component (A).

The method for producing the propylene polymer component (B) in the second step is a gas phase polymerization method. Examples of the reactor to be used for the gas phase polymerization method include a gas phase fluidized bed reactor and a horizontal mechanical agitation type gas phase reactor. The production of the propylene polymer component (B) may be carried out in one reactor or alternatively may be carried out using a plurality of reactors.

The polymerization temperature at which the propylene polymer component (B) is produced in the second step is usually 20° C. to 150° C.; from the perspective that the efficiency of the production of a propylene polymeric material is high and the perspective that a propylene polymeric material can be produced more stably without occurrence of stop of the operation due to clogging of a pipe, it is preferably 35° C. to 95° C., more preferably 50° C. to 80° C.

The total pressure of the gas phase in the reactor during the production of the propylene polymer component (B) in the second step is usually atmospheric pressure or more; from the perspective that the efficiency of the production of a propylene polymeric material is high and the perspective that a propylene polymeric material can be produced more stably without occurrence of stop of the operation due to clogging of a pipe, it is preferably 0.5 MPa to 3 MPa, more preferably 0.7 MPa to 1.5 MPa.

When a gas phase fluidized bed reactor is used for the production of the propylene polymer component (B) in the second step, the gas superficial velocity in the reactor is usually 0.01 m/second to 1.00 m/second, preferably 0.10 m/second to 0.80 m/second.

During the production of the propylene polymer component (B2) in the second step, the partial pressure of the α-olefin having 4 or more carbon atoms in the gas phase in the reactor is 0.01 MPa or more, preferably 0.015 MPa or more, from the perspective that the efficiency of the production of the propylene polymeric material is higher. The partial pressure is more preferably 0.020 MPa or more, even more preferably 0.0265 MPa or more.

When the partial pressure of the α-olefin having 4 or more carbon atoms in the gas phase contained within the reactor of the second step is expressed by X MPa and the content of the propylene polymer component (A) in the propylene polymeric material is expressed by Y % by weight, where the whole amount of the propylene polymeric material is taken as 100% by weight, the following formula (1) is satisfied:

$$X \leq 0.0025 \times Y + 0.2850 \quad (1)$$

From the perspective that a propylene polymeric material can be produced with stability, the following formula (2) is preferably satisfied, and the following formula (3) is more preferably satisfied:

$$X \leq 0.0025 \times Y + 0.2750 \quad (2)$$

$$X < 0.0025 \times Y + 0.2625 \quad (3)$$

In the production of the propylene polymer component (B2) in the second step, an inert gas such as nitrogen may be added in order to lower the partial pressure of the α-olefin having 4 or more carbon atoms in the gas phase in the reactor.

In the production of the propylene polymeric material of the present invention, a saturated hydrocarbon having 6 or more carbon atoms may be used.

Examples of the uses of the saturated hydrocarbon having 6 or more carbon atoms include a catalyst component dilution solvent and a polymerization solvent. Another exemplary use is a washing solvent for nozzles for monomer feed of the like provided to a polymerization reactor or the like.

Examples of the saturated hydrocarbon having 6 or more carbon atoms include hexane, cyclohexane, heptane, cycloheptane, and octane. When a saturated hydrocarbon having 6 or more carbon atoms is used, the concentration of the saturated hydrocarbon having 6 or more carbon atoms in the gas phase in the reactor during the production of the propylene polymer component (B2) in the second step is, from the perspective that a propylene polymeric material can be produced with stability without occurrence of stop of the operation due to clogging of a pipe, preferably not more than 1.0 mol %, more preferably not more than 0.5 mol %, where the sum total of the concentrations of all kinds of gas contained in the reactor of the second step is taken as 100 mol %.

When two or more kinds of saturated hydrocarbon having 6 or more carbon atoms are used, the concentration of the saturated hydrocarbon having 6 or more carbon atoms is the sum total of the concentrations of the individual kinds of saturated hydrocarbons having 6 or more carbon atoms.

The method for producing the propylene polymeric material of the present invention may comprise, after the second step, a step of performing post treatment. Examples of the post treatment include treatment of deactivating a catalyst, treatment of removing a solvent or a remaining monomer, desiccation, and granulation. The temperature at which the step of performing the post treatment is carried out is usually 25° C. to 120° C., preferably 50° C. to 90° C. The pressure at which the step of performing the post treatment is carried out is usually atmospheric pressure to 1 MPa, preferably atmospheric pressure to 0.2 MPa.

The propylene polymeric material produced by the method of the present invention (henceforth referred to as "the propylene polymeric material of the present invention") can be molded into a film or a sheet. A method for producing the film or the sheet may be a production method known in the art and examples thereof include a T-die method, a blown film extrusion method, and a calendering method.

The film or the sheet may be a multilayer film or a multilayer sheet in which a different resin is combined. A method for multilayering a film or a sheet may be a coextrusion method. Examples thereof include a method involving use of a feed block type die which combines, in layers within the die, molten resins received from a plurality of extruders, and a method involving use of a multi-manifold type die in which molten resins received from a plurality of extruders are fed into separate manifolds and are combined in layers immediately before a lip of the die.

The film or the sheet may be stretched. Examples of the method of stretching the film or the sheet include uniaxially or biaxially stretching methods by the roll stretching method, the tenter stretching method, the tubular stretching method, or the like, and a biaxially stretching method is preferred in order to improve the balance of the low-temperature heat sealability, the transparency, and the rigidity of a film.

A film produced by molding the propylene polymeric material of the present invention is used, for example, as a film for packaging. Examples of the film for packing includes a film for food packing and a film for clothing packing; a film for food packing is preferred.

At the time of molding the propylene polymeric material of the present invention, additives or other resins may be added before the molding. Examples of the additives include antioxidants, UV absorbers, antistatic agents, lubricants, nucleating agents, anticlouding agents, and antiblocking agents. Examples of such additional resins include polyolefin resins such as polyethylene resin and polypropylene resin.

EXAMPLES

The present invention is described in more detail below with reference to examples and comparative examples.

The measured values of the items in examples and comparative example were measured by the following methods.

It is noted that the "polymer obtained per unit time in the first step" referred to in the following (1) and the "polymer obtained in the first step" in the following (4) are polymers obtained by performing only the first step under the conditions described in the following Examples 1 to 4 and Comparative Examples 1 and 2.

(1) Contents of Propylene Polymer Component (1) and Propylene Polymer Component (2) (Unit: % by Weight)

Content of propylene polymer component (1)(unit: % by weight)=[the amount of the polymer obtained per unit time in the first step(in kg/hr)]/[the amount of the polymer obtained per unit time in the second step(in kg/hr)]×100

Content of propylene polymer component (2)(unit: % by weight)=100% by weight−[the content of the propylene polymer component(1)(unit: % by weight)]

(2) Contents of the Monomer Units Derived from Ethylene (Henceforth, Ethylene Contents) in Propylene Polymer Component (1) and Propylene Polymer Component (2) (Unit: % by Weight)

IR-spectrum measurement disclosed at page 616 of Polymer Handbook (published by Kinokuniya Co., Ltd., 1995) was performed, and then the ethylene content in the propylene polymer component (1) was determined. The ethylene content in the propylene polymer component (2) was calculated from the following formula [I] using the content of the propylene polymer component (1), the content of the propylene polymer component (2), and the ethylene contents in the propylene polymeric material and the propylene polymer component (1).

(Ethylene content of component (2)(unit: % by weight))=[(ethylene content of propylene polymeric material(unit: % by weight))×100−(ethylene content of propylene polymer component (1)(unit: % by weight))×(content of propylene polymer component (1)(unit: % by weight))]/ (content of propylene polymer component (2) (unit: % by weight))    [I]

When the value calculated from the above formula was a minus value, the ethylene content in the propylene polymer component (2) was determined to be zero.

(3) Content of Monomer Units Derived from 1-Butene in Propylene Polymer Component (2) (Henceforth, 1-Butene Content) (Unit: % by Weight)

IR-spectrum measurement disclosed at page 619 of Polymer Handbook (published by Kinokuniya Co., Ltd., 1995) was performed, and then the 1-butene content in the propylene polymeric material was determined. The 1-butene content in the propylene polymer component (2) was calculated from the following formula [II] using the content of the propylene polymer component (2) and the 1-butene content in the propylene polymeric material.

(1-Butene content in propylene polymer component (2)(unit: % by weight))=(1-butene content in propylene polymeric material(unit: % by weight))×100/(content of propylene polymer component (2)(unit: % by weight))    [II]

(4) Intrinsic viscosity of propylene polymer component (1) ([η]A), intrinsic viscosity of propylene polymer component (2) ([η]B), and intrinsic viscosity of propylene polymeric material ([η]) (unit: dl/g)

A polymer obtained in the first step and a polymer obtained in the second step were each measured in tetralin at 135° C. by using a Ubbelohde viscometer, and then [η]A and [η] were determined by an extrapolation method in accordance with the calculation method disclosed at page 491 of "Kobunshi Yoeki (Polymer Solution), Kobunshi Jikkengaku (Polymer Experiment Study) Vol. 11" (published by Kyoritsu Shuppan Co., Ltd., 1982).

[η]B was calculated from the following formula [III] using [η]A, [η], the content of the propylene polymer component (1) (PA (unit: % by weight)), and the content of the propylene polymer component (2) (PB (unit: % by weight)).

[η]B=([η]AB−[η]A×PA/100)×100/PB    [III]

(5) 5φ Agglomerate Ratio

A propylene polymeric material was passed through a sieve with 5-mm openings and the weight of the particles having failed to pass and remaining on the sieve was measured and the ratio of the particles remaining on the sieve was calculated from the following formula.

The ratio of 5φ agglomerated propylene polymeric material=(the amount of the particles remaining on the sieve, expressed in the number of milligrams)/(the amount of the propylene polymeric material subjected to the sieving, expressed in the number of kilograms)

(6) Production Stability Evaluation

Production stability was evaluated as follows:

◯: The 5φ agglomerate ratio of the propylene polymeric material is 100 or less, and no failure of the propylene polymeric material to be withdrawn from the gas phase fluidized bed reactor occurred during the second step, and stable continuous production could be carried out without occurrence of clogging of a pipe.

Δ: The 5φ agglomerate ratio of the propylene polymeric material is 100 or more, but continuous production could be carried out without occurrence of clogging of a pipe through a little failure of the propylene polymeric material to be withdrawn occurred when the material was withdrawn from the gas phase fluidized bed reactor during the second step.

x: The 5φ agglomerate ratio of the propylene polymeric material is 100 or more, and the production became difficult and the operation was stopped due to occurrence of clogging of withdrawal piping when the propylene polymeric material was withdrawn from the gas phase fluidized bed reactor during the second step.

(5) 1-Butene Concentration, Hexane Concentration, and Heptane Concentration of Gas Phase in Gas Phase Polymerization Reactor Measurement was carried out by gas chromatography.

GC-2014 manufactured by Shimadzu Corporation was used for the gas chromatography.

(6) 1-Butene Partial Pressure in Gas Phase Polymerization Reactor

When the butene partial pressure is denoted by X MPa, the pressure in the gas phase polymerization reactor is denoted by Y MPa, and the 1-butene concentration of the gas phase is denoted by Z mol %, X is determined from the following formula [IV].

$X = Y \times Z/100$    [IV]

The pressure in the gas phase polymerization reactor is an absolute pressure and is the sum total of a relative pressure to atmospheric pressure indicated in the pressure gauge of the reactor, and the atmospheric pressure (0.1013 MPa).

Example 1

Synthesis of Solid Catalyst Component

A 200-L SUS reactor equipped with a stirrer was purged with nitrogen. Then, 80 L of hexane, 6.55 mol of titanium tetrabutoxide, 2.8 mol of diisobutyl phthalate, and 98.9 mol of tetrabutoxysilane were charged therein to form a homogeneous solution. Subsequently, 51 L of a solution of butyl magnesium chloride with a concentration of 2.1 mol/L in diisobutyl ether was dropped slowly over 5 hours with maintenance of the temperature in the reactor at 5° C. After the dropping was completed, the mixture was further stirred for one hour at room temperature, followed by solid-liquid separation at room temperature, and then the collected solid was washed with 70 L of toluene repeatedly three times. Subsequently, after removing toluene so as to adjust the slurry concentration to 0.6 kg/L, a mixed solution of 8.9 mol of di-n-butyl ether and 274 mol of titanium tetrachloride was added and then 20.8 mol of phthalic acid chloride was further added, and a reaction was carried out at 110° C. for 3 hours. After the completion of the reaction, solid-liquid separation was carried out at the same temperature, and then the collected solid was washed with 90 L of toluene twice at 95° C. After adjusting the slurry concentration to 0.6 kg/L, 3.13 mol of diisobutyl phthalate, 8.9 mol of di-n-butyl ether and 137 mol of titanium tetrachloride were added, and a reaction was carried out at 105° C. for one hour. After the completion of the reaction, solid-liquid separation was carried out at the same temperature, and then the collected solid was washed with 90 L of toluene twice at 95° C. Subsequently, the slurry concentration was adjusted to 0.6 kg/L, and then 8.9 mol of di-n-butyl ether and 137 mol of titanium tetrachloride were added, and a reaction was carried out at 95° C. for one hour. After the completion of the reaction, solid-liquid separation was carried out at the same temperature, and the collected solid was washed with 90 L of toluene at that temperature three times. Subsequently, the slurry concentration was adjusted to 0.6 kg/L, and then 8.9 mol of di-n-butyl ether and 137 mol of titanium tetrachloride were added, and a reaction was carried out at 95° C. for one hour. After the completion of the reaction, solid-liquid separation was carried out at the same temperature, the collected solid was washed with 90 L of toluene at that temperature three times, and washing with 90 L of hexane was further carried out three times, followed by drying under reduced pressure. Thus, 11.0 kg of a solid catalyst component was obtained. The solid catalyst component comprised 1.89% by weight of titanium atoms, 20% by weight of magnesium atoms, 8.6% by weight of phthalate, 0.05% by weight of ethoxy groups, and 0.21% by weight of butoxy groups, and had good particle properties with no fine powder.

[Preliminary Activation of Solid Catalyst Component]

A stainless steel autoclave of 3 liters in capacity equipped with a stirrer was charged with 1.5 L of fully dehydrated, degassed n-hexane, 27.8 mmol of triethylaluminum, 2.78 mmol of tert-butyl-n-propyldimethoxysilane, and 15 g of the solid catalyst component mentioned above, and 30 g of propylene was continuously fed over 30 minutes with maintenance of the temperature in the reactor at a temperature of 5 to 15° C., thereby performing preliminary activation. Then, the resulting slurry of a solid catalyst component was transferred to a stainless steel autoclave of 200 L in capacity equipped with a stirrer, diluted by the addition of 140 L of liquid butane, and stored at a temperature not higher than 5° C.

[Polymerization]
(First Step)

A propylene polymer component (1) was obtained by use of a continuous polymerization reactor composed of two tandem-connected stainless steel reactors each of 163 L in capacity equipped with a stirrer. First, 25 kg/hr of liquid propylene, 0.23 kg/hr of ethylene, and 4.0 NL/hr of hydrogen were fed to a first reactor, and moreover 0.65 g/hr of the preliminarily activated solid catalyst component, 36 mmol/hr of triethylaluminum, and 8.8 mmol/hr of tert-butyl-n-propyldimethoxysilane were fed, and slurry polymerization using liquid propylene as a medium was continued at a polymerization temperature of 53° C. and a polymerization pressure of 2.25 MPa under conditions for maintaining the amount of slurry substantially remaining within the reactor at 50 L. A resulting slurry containing a polymer was continuously transferred to a second reactor without being deactivated. To the second reactor, 15 kg/hr of liquid propylene, 0.28 kg/hr of ethylene, and 2.3 NL/hr of hydrogen were fed in addition to the slurry containing the polymer transferred from the first reactor, and slurry polymerization using liquid propylene as a medium was continued at a polymerization temperature of 48° C. and a polymerization pressure of 2.10 MPa under conditions for maintaining the amount of slurry substantially remaining within the reactor at 50 L. Thus, 6.5 kg/hr of a propylene polymer component (1) was obtained. The composition and the physical properties of the resulting propylene polymer are shown in Table 1. The resulting slurry containing the propylene polymer component (1) was continuously transferred to a reactor of a second step without being deactivated.

(Second Step)

A gas phase fluidized bed reactor of 1 m3 in capacity equipped with a stirrer was used. Under conditions where propylene, hydrogen, 1-butene, and nitrogen were fed so that the polymer retention amount in the fluidized bed might be 95 kg, the polymerization temperature might be 70° C., the polymerization pressure might be 1.3 MPa, the gas superficial velocity in the reactor might be 0.27 m/second, the hydrogen concentration of the gas phase might be 0.4 mol %, the 1-butene concentration of the gas phase might be 27 mol % (the 1-butene partial pressure might be 0.35 MPa), and the hexane concentration of the gas phase might be not more than 0.5 mol %, the slurry containing the propylene polymer component (1) fed from the reactor of the first step was subjected to continuous polymerization, obtaining 19.1 kg/hr of a propylene polymeric material, which was then continuously transferred to a post-treatment step and subjected to drying of the propylene polymeric material and deactivation of the catalyst.

The composition and the physical properties of the resulting propylene polymeric material are shown in Table 1, and the 5ϕ agglomerate ratio and the evaluated result of the production stability of the propylene polymeric material are shown in Table 2.

Example 2

Polymerization (First Step)

A propylene polymer component (1) was obtained by carrying out continuous polymerization in a stainless steel reactor of 163 L in capacity equipped with a stirrer. To the reactor were fed 38 kg/hr of liquid propylene, 0.30 kg/hr of ethylene, and 6.7 NL/hr of hydrogen, and further synthesis was carried out in the same manner as in Example 1. Then, 0.43 g/hr of a preliminarily activated solid catalyst component, 26 mmol/hr of triethylaluminum and 6.8 mmol/hr of tert-butyl-n-propyldimethoxysilane were fed, and slurry polymerization using liquid propylene as a medium was continued at a polymerization temperature of 55° C. and a polymerization pressure of 2.25 MPa under conditions for maintaining the amount of slurry substantially remaining within the reactor at 35 L. Thus, 2.7 kg/hr of a propylene polymer component (1) was obtained. The composition and the physical properties of the resulting propylene polymer component (1) are shown in Table 1. The resulting slurry containing the propylene polymer component (1) was continuously transferred to a reactor of a second step without being deactivated.

(Second Step)

A propylene polymeric material in an amount of 13.3 kg/hr was obtained by carrying out continuous polymerization in the same manner as in Example 1 except that the polymer retention amount in the fluidized bed, the gas superficial velocity in the reactor, the 1-butene concentration of the gas phase, and the 1-butene partial pressure of the gas phase were changed as shown in Table 2. The composition and the physical properties of the resulting propylene polymeric material are as shown in Table 1.

The composition and the physical properties of the resulting propylene polymeric material are shown in Table 1, and the 5φ agglomerate ratio and the evaluated result of the production stability of the propylene polymeric material are shown in Table 2.

Example 3

Polymerization (First Step)

A propylene polymer component (1) in an amount of 1.9 kg/hr was obtained by carrying out continuous polymerization in the same manner as in Example 2 except that the fed amounts of the liquid propylene, ethylene, hydrogen, preliminarily activated solid catalyst component, triethylaluminum, and tert-butyl n-propyldimethoxysilane, the polymerization pressure, and the amount of slurry remaining within the reactor were changed as shown in Table 2. The composition and the physical properties of the resulting propylene polymer component (1) are shown in Table 1. The resulting slurry containing the propylene polymer component (1) was continuously transferred to a reactor of a second step without being deactivated.

(Second Step)

A propylene polymeric material in an amount of 17.0 kg/hr was obtained by carrying out continuous polymerization in the same manner as in Example 1 except that the polymer retention amount in the fluidized bed, the gas superficial velocity in the reactor, the 1-butene concentration of the gas phase, and the 1-butene partial pressure of the gas phase were changed as shown in Table 2. The composition and the physical properties of the resulting propylene polymeric material are shown in Table 1, and the 5φ agglomerate ratio and the evaluated result of the production stability of the propylene polymeric material are shown in Table 2.

Example 4

Polymerization (First Step)

A propylene polymer component (1) in an amount of 2.0 kg/hr was obtained by carrying out continuous polymerization in the same manner as in Example 2 except that the fed amounts of the liquid propylene, ethylene, hydrogen, preliminarily activated solid catalyst component, triethylaluminum, and tert-butyl n-propyldimethoxysilane, the polymerization pressure, and the amount of slurry remaining within the reactor were changed as shown in Table 2. The composition and the physical properties of the resulting propylene polymer component (1) are shown in Table 1. The resulting slurry containing the propylene polymer component (1) was continuously transferred to a reactor of a second step without being deactivated.

(Second Step)

A propylene polymeric material having a configuration shown in Table 1 was obtained in an amount of 9.8 kg/hr by carrying out continuous polymerization in the same manner as in Example 1 except that the polymer retention amount in the fluidized bed, the gas superficial velocity in the reactor, the 1-butene concentration of the gas phase, and the 1-butene partial pressure of the gas phase were changed as shown in Table 2 and hexane and heptane were fed so that the total of the concentrations of hexane and heptane in the gas phase might exceed 1.0 mol %. The composition and the physical properties of the resulting propylene polymeric material are shown in Table 1, and the 5φ agglomerate ratio and the evaluated result of the production stability of the propylene polymeric material are shown in Table 2.

Comparative Example 1

Polymerization (First Step)

A propylene polymer component (1) was obtained in an amount of 5.0 kg/hr by carrying out continuous polymerization in the same manner as in Example 1 except that the fed amounts of the liquid propylene, ethylene, hydrogen, preliminarily activated solid catalyst component, and tert-butyl n-propyldimethoxysilane, the polymerization pressure, and the polymerization temperature of the first step were changed as shown in Table 2. The composition and the physical properties of the resulting propylene polymer component (1) are shown in Table 1. The resulting slurry containing the propylene polymer component (1) was continuously transferred to a reactor of a second step without being deactivated.

(Second Step)

A propylene polymeric material was obtained in an amount of 19.1 kg/hr by carrying out continuous polymerization in the same manner as in Example 1 except that the 1-butene concentration of the gas phase and the 1-butene partial pressure of the gas phase were changed as shown in Table 2. The composition and the physical properties of the resulting propylene polymeric material are shown in Table 1, and the 5φ agglomerate ratio and the evaluated result of the production stability of the propylene polymeric material are shown in Table 2.

Comparative Example 2

Polymerization (First Step)

A propylene polymer component (1) was obtained in an amount of 2.7 kg/hr by carrying out continuous polymerization in the same manner as in Example 2 as shown in Table 2. The composition and the physical properties of the resulting propylene polymer component (1) are shown in Table 1. The resulting slurry containing the propylene polymer component (1) was continuously transferred to a reactor of a second step without being deactivated.

(Second Step)

A propylene polymer having a configuration shown in Table 1 was obtained in an amount of 16.8 kg/hr by carrying out continuous polymerization in the same manner as in Example 1 except that the polymer retention amount in the fluidized bed, the gas superficial velocity in the reactor, the 1-butene concentration of the gas phase, and the 1-butene partial pressure of the gas phase were changed as shown in Table 2. The composition and the physical properties of the resulting propylene polymeric material are shown in Table 1, and the 5φ agglomerate ratio and the evaluated result of the production stability of the propylene polymeric material are shown in Table 2.

TABLE 1

|  |  | Example 1 | Example 2 | Example 3 | Example 4 | Comparative Example 1 | Comparative Example 2 |
|---|---|---|---|---|---|---|---|
| Propylene polymer component (1) | Content of component (A) (% by weight) | 34.1 | 20.3 | 11.2 | 20.4 | 26.2 | 16.1 |
|  | Ethylene content in component (A) (% by weight) | 4.4 | 4.7 | 4.1 | 3.6 | 5.5 | 3.9 |
|  | [η] of component (A) (dl/g) | 2.9 | 3.2 | 2.8 | 2.8 | 3.2 | 3.2 |
| Propylene polymer component (2) | Content of component (B) (% by weight) | 65.9 | 79.7 | 88.8 | 79.6 | 73.8 | 83.9 |
|  | Ethylene content in component (B) (% by weight) | 0.0 | 0.2 | 0.0 | 0.0 | 0.0 | 0.3 |
|  | Butene content in component (B) (% by weight) | 23.2 | 24.1 | 25.1 | 25.8 | 22.9 | 24.3 |
|  | [η] of component (B) (dl/g) | 2.2 | 2.2 | 2.3 | 2.4 | 2.4 | 2.2 |
| Propylene polymeric material | Ethylene content (% by weight) | 1.4 | 1.1 | 0.4 | 0.5 | 1.4 | 0.9 |
|  | Butene content (% by weight) | 15.3 | 19.2 | 22.3 | 20.5 | 16.9 | 20.4 |
|  | [η] (dl/g) | 2.4 | 2.4 | 2.3 | 2.5 | 2.6 | 2.4 |

TABLE 2

|  |  | Example 1 | | Example 2 | Example 3 | Example 4 | Comparative Example 1 | | Comparative Example 2 |
|---|---|---|---|---|---|---|---|---|---|
|  |  | First reactor | Second reactor |  |  |  | First reactor | Second reactor |  |
| First step | Polymerization temperature (° C.) | 53 | 48 | 55 | 55 | 55 | 55 | 48 | 55 |
|  | Polymerization pressure (MPa) | 2.25 | 2.1 | 2.25 | 2.45 | 2.48 | 2.29 | 2.08 | 2.25 |
|  | Feed amount of liquid propylene (kg/hr) | 25 | 15 | 38 | 26 | 13 | 29 | 17 | 38 |
|  | Feed amount of ethylene (kg/hr) | 0.23 | 0.28 | 0.30 | 0.17 | 0.13 | 0.27 | 0.31 | 0.30 |
|  | Feed amount of hydrogen (NL/hr) | 4.0 | 2.3 | 6.7 | 4.6 | 2.5 | 4.6 | 3.0 | 6.7 |
|  | Feed amount of preliminarily activated solid catalyst component (kg/hr) | 0.65 | — | 0.43 | 0.62 | 0.57 | 0.71 | — | 0.43 |
|  | Feed amount of triethylaluminum (kg/hr) | 36 | — | 26 | 22 | 18 | 36 | — | 26 |
|  | Feed amount of tert-butyl-n-propyldimethoxysilane (kg/hr) | 3.8 | — | 6.8 | 5.4 | 4.5 | 8.9 | — | 6.8 |
|  | Amount of slurry remaining within reactor (L) | 50 | 50 | 35 | 18 | 18 | 50 | 50 | 35 |
| Second step | Polymerization temperature (° C.) | 70 | | 70 | 70 | 70 | 70 | | 70 |
|  | Polymerization pressure (MPa) | 1.3 | | 1.3 | 1.3 | 1.3 | 1.3 | | 1.3 |
|  | Hydrogen concentration (mol %) | 0.4 | | 0.4 | 0.4 | 0.4 | 0.4 | | 0.4 |
|  | 1-Butene concentration (mol %) | 27.0 | | 23.8 | 21.8 | 23.0 | 28.0 | | 26.5 |
|  | Hexane concentration (mol %) | 0.50 or less | | 0.50 or less | 0.50 or less | 0.21 | 0.50 or less | | 0.50 or less |
|  | Heptane concentration (mol %) | 0.0 (no use) | | 0.0 (no use) | 0.0 (no use) | 0.93 | 0.0 (no use) | | 0.0 (no use) |
|  | 1-Butene partial pressure (MPa) | 0.351 | | 0.309 | 0.283 | 0.299 | 0.364 | | 0.345 |
|  | Polymer retention amount of fluidized bed (kg) | 95 | | 90 | 85 | 85 | 95 | | 90 |
|  | Gas superficial velocity in reactor (m/second) | 0.27 | | 0.34 | 0.30 | 0.16 | 0.27 | | 0.34 |
|  | 1-Butene partial pressure of formula A (MPa) *1 | 0.370 | | 0.336 | 0.313 | 0.336 | 0.351 | | 0.325 |
| Production state | 5φ agglomerate ratio of propylene polymer material (mg/kg) | 32 | | 0 | 68 | 607 | 1000 or more | | 309 |
|  | Occurrence of failure of propylene polymeric material to be withdrawn from gas phase fluidized bed reactor | No | | No | No | Yes | Yes | | Yes |
|  | Occurrence of stop of operation due to failure of propylene polymeric material to be withdrawn from gas phase fluidized bed reactor | No | | No | No | No | Yes | | Yes |
|  | Evaluation of production stability | ○ | | ○ | ○ | Δ | x | | x |

$$X = 0.0025 \times Y + 0.2850 \quad (A)$$

*1 Formula A in Table 2 is the following formula (A), wherein a butene partial pressure is denoted by X MPa and the content of a propylene polymer component (1) in a propylene polymeric material is denoted by Y % by weight, where the whole amount of the propylene polymeric material is taken as 100% by weight.

What is claimed is:

1. A method for producing a propylene polymeric material composed of not less than 11% by weight and less than 35% by weight of a propylene polymer component (A) defined below and more than 65% by weight and less than 89% by weight of a propylene polymer component (B) defined below via at least two steps, where the whole amount of the propylene polymeric material is taken as 100% by weight, the method comprising the following first step and second step:

the first step of polymerizing at least propylene and ethylene within a reactor to produce the propylene polymer component (A), and the second step of polymerizing at least propylene and an α-olefin having 4 or more carbon atoms, in a gas phase contained within a reactor, in the presence of the propylene polymer component (A) under conditions fulfilling the following requirement (a) to produce the propylene polymer component (B), wherein the propylene polymer component (A) is: a propylene-ethylene copolymer component (A1) comprising monomer units derived from propylene and monomer units derived from ethylene, wherein the content of the monomer units derived from propylene is not less than 90% by weight and not more than 99% by weight and the content of the monomer units derived from ethylene is not less than 1% by weight and not more than 10% by weight, where the sum total of the content of the monomer units derived from propylene and the content of the monomer units derived from ethylene is taken as 100% by weight, or a propylene-ethylene-α-olefin copolymer component (A2) comprising monomer units derived from propylene, monomer units derived from ethylene, and monomer units derived from an α-olefin having 4 or more carbon atoms, wherein the content of the monomer units derived from propylene is not less than 85% by weight and not more than 98.9% by weight, the content of the monomer units derived from ethylene is not less than 1% by weight and not more than 10% by weight, and the content of the monomer units derived from the α-olefin having 4 or more carbon atoms is not less than 0.1% by weight and not more than 5% by weight, where the sum total of the content of the monomer units derived from propylene, the content of the monomer units derived from ethylene, and the content of the monomer units derived from the α-olefin having 4 or more carbon atoms is taken as 100% by weight, the propylene polymer component (B) is: a propylene-α-olefin copolymer component (B1) comprising monomer units derived from propylene and monomer units derived from an α-olefin having 4 or more carbon atoms, wherein the content of the monomer units derived from propylene is not less than 50% by weight and not more than 80% by weight and the content of the monomer units derived from the α-olefin having 4 or more carbon atoms is not less than 20% by weight and not more than 50% by weight, where the sum total of the content of the monomer units derived from propylene and the content of the monomer units derived from the α-olefin having 4 or more carbon atoms is taken as 100% by weight, or a propylene-ethylene-α-olefin copolymer component (B2) comprising monomer units derived from propylene, monomer units derived from ethylene, and monomer units derived from an α-olefin having 4 or more carbon atoms, wherein the content of the monomer units derived from propylene is not less than 40% by weight and not more than 79.9% by weigh, the content of the monomer units derived from ethylene is not less than 0.1% by weight and not more than 10% by weight, and the content of the monomer units derived from the α-olefin having 4 or more carbon atoms is not less than 20% by weight and not more than 50% by weight, where the sum total of the content of the monomer units derived from propylene, the content of the monomer units derived from ethylene, and the content of the monomer units derived from the α-olefin having 4 or more carbon atoms is taken as 100% by weight, and requirement (a) is that the partial pressure of the α-olefin having 4 or more carbon atoms in the gas phase contained within the reactor of the second step is not lower than 0.10 MPa, and the following formula (1) is satisfied: wherein said partial pressure is expressed by X MPa and the content of the propylene polymer component (A) in the propylene polymeric material is expressed by Y % by weight, where the whole amount of the propylene polymeric material is taken as 100% by weight $$X \leq 0.0025 \times Y + 0.2850 \tag{1}.$$

2. The method for producing a propylene polymeric material according to claim 1, wherein a saturated hydrocarbon having 6 or more carbon atoms is used and the concentration of said saturated hydrocarbon in the gas phase contained within the reactor of the second step is not more than 1.0 mol %.

* * * * *